United States Patent [19]

Oertel et al.

[11] 3,912,680

[45] Oct. 14, 1975

[54] LIGHT FAST POLYURETHANE UREA COATING SOLUTIONS

[75] Inventors: Harald Oertel, Odenthal-Gloebusch; Bruno Zorn, Cologne; Hans Joachim Koch, Leverkusen; Gerhard Berndt, Monheim; Klaus Noll, Cologne, all of Germany

[73] Assignee: Bayer Aktiengesellschaft, Leverkusen, Germany

[22] Filed: July 22, 1974

[21] Appl. No.: 490,630

Related U.S. Application Data

[63] Continuation-in-part of Ser. No. 353,035, April 20, 1973, abandoned.

[30] Foreign Application Priority Data

May 4, 1972    Germany............................ 2221750

[52] U.S. Cl. ..... 260/29.2 TN; 260/75 NQ; 156/230; 156/237; 156/331; 427/358; 427/412; 428/342; 428/425
[51] Int. Cl.² .................. C08G 18/75; B32B 27/40; D06N 3/08
[58] Field of Search.............................. 260/29.2 TN

[56] References Cited

UNITED STATES PATENTS

| | | | |
|---|---|---|---|
| 3,213,049 | 10/1965 | Heiss............................ | 260/29.2 TN |
| 3,325,421 | 6/1967 | Muller.......................... | 260/29.2 TN |
| 3,377,308 | 4/1968 | Oertel et al. ................. | 260/77.5 SP |
| 3,437,624 | 4/1969 | Dawn et al. ................. | 260/29.2 TN |
| 3,513,125 | 5/1970 | Kehr............................. | 260/29.2 TN |
| 3,539,483 | 11/1970 | Keberle et al. .............. | 260/29.2 TN |
| 3,655,627 | 4/1972 | Hutzler et al................ | 260/29.2 TN |

*Primary Examiner*—Murray Tillman
*Assistant Examiner*—Arthur H. Koeckert
*Attorney, Agent, or Firm*—Joseph C. Gil

[57] ABSTRACT

A process for the preparation of stable polyurethane urea solutions by chain lengthening with bifunctional hydrazide compounds prepolymers prepared from dihydroxy compounds and excess 1-isocyanato-3-isocyanato-methyl-3,5,5-trimethylcyclohexane. The polyurethane ureas dissolved in a mixture of water, aromatic hydrocarbons and aliphatic alcohols can be used for producing coatings which have exceptional light fastness.

8 Claims, No Drawings

LIGHT FAST POLYURETHANE UREA COATING SOLUTIONS

This application is a continuation-in-part of copending application Ser. No. 353,035 filed Apr. 20, 1973, now abandoned.

This application relates to a process for the preparation of stable polyurethane urea solutions by chain lengthening with bifunctional hydrazide compounds prepolymers prepared from dihydroxy compounds and excess 1-isocyanato-3-isocyanato-methyl-3,5,5,-trimethylcyclohexane. The polyurethane ureas dissolved in a mixture of water, aromatic hydrocarbons and aliphatic alcohols can be used for producing coatings which have exceptional light fastness.

The preparation of polyurethane urea solutions using dihydrazide compounds as chain lengthening agents has been disclosed in numerous patent specifications for example U.S. Pat. Nos. 3,367,889; 3,377,308; 3,432,456; 3,461,102; 3,640,937; 3,658,746; 3,635,870; 3,708,453 and 3,719,708. All these processes are carried out using very polar solvents which contain amide, sulphoxide or sulphone groups, e.g. dimethylformamide, dimethylsulphoxide or tetramethylenesulphone.

These solvents, however, have high boiling points, are sometimes physiologically harmful and on account of their high cost they require the installation of expensive recovery plants. In addition, removal of these solvents requires relatively high temperatures. It has also frequently been recommended to use such polyurethane urea solutions for the production of foils, films and textile coatings but they have numerous disadvantages for this purpose, including those already mentioned above. Very polar solvents with high boiling points are unsuitable for use in producing textile coatings mainly because the coating composition is liable to penetrate the textile in the course of the prolonged evaporation of the solvent so that an undesirable stiff handle is imparted to the textile. For use as finishes or the like these very polar solvents are also undesirable because they have a powerful dissolving action so that they attack the coatings previously applied to the extent of causing them to shrink or even to become detached.

Less highly polar solvents such as dioxane, tetrahydrofuran, methyl ethyl ketone or toluene may only be used in proportions of up to about 30% in the known processes because owing to their inferior dissolving powers they are not capable of keeping the polyurethane ureas in solution. None of the polymers mentioned in the examples of the above mentioned patent specifications can be obtained in the form of stable solutions when using these less polar solvents alone.

Dihydrazide compounds also are not soluble in less polar solvents such as alcohols, ethers or esters, let alone in hydrocarbons, or only in such small quantities they they cannot be obtained in the concentrations required for the chain lengthening reaction (approximately 1–10% by weight solutions). Numerous other less polar liquids which are preferred for technical applications, such as methyl ethyl ketone, cyclohexanone or other ketone derivatives, cannot be used as solvents owing to the risk of hydrazone formation with the hydrazides. The use of esters also entails a certain risk, especially if the solutions have to be heated in order to obtain sufficiently high concentrations of the hydrazide chain lengthening agents.

It is also known that polyurethanes which are soluble in less polar solvents, e.g. in toluene/alcohol mixtures, and can readily be workded up from these solutions can be obtained from polymers based on certain aliphatic or cycloaliphatic diisocyanates by a process of glycol or diamine chain lengthening.

Previously known polyurethane ureas of this kind, however, lose their mechanical strength comparatively rapidly when exposed to light. Moreover, coatings produced from them have a relatively low abrasion resistance and resistance to swelling.

An object of this invention is to produce elastomers which are soluble not only in highly polar, toxic and expensive solvents but also in certain mixtures of alcohols and aromatic hydrocarbons, simultaneously being insoluble in aromatic hydrocarbons and pure or aqueous alcohols alone. The latter property becomes important during dry cleaning or if the textile coating comes into contact with aqueous alcohol.

It has now been found that stable solutions of polyurethane ureas in relatively volatile, non-polar solvents, which solutions are suitable for producing exceptionally lightfast, abrasion resistant and swell resistant coatings on textiles or on leather or synthetic leather substrates can be prepared by 1. using 1-isocyanato-3-isocyanatomethyl-3,5,5-trimethylcyclohexane as the only diisocyanate component or as predominantly the only diisocyanate component for preparation of the prepolymer;
2. using certain solvents for the chain lengthening reaction, namely mixtures of aromatic hydrocarbon and/or aliphatic chlorinated hydrocarbons with aliphatic and/or cycloaliphatic monohydric alcohols and minor quantities of water; and
3. using dihydrazide compounds dissolved in 0.5 to 5 times their weight of water as chain lengthening agents.

This invention thus relates to a process for the preparation of stable solutions of polyurethane ureas from prepolymers which contain terminal isocyanate groups, if desired low molecular weight diisocyanates, and dihydrazide compounds as chain lengthening agents in readily volatile comparatively non-polar solvents, characterized in that prepolymers with terminal NCO groups prepared from a. polyhydroxyl compounds with a molecular weight of 500 to 5000,
b. if desired diols with molecular weights of between 62 and 500, and
c. aliphatic or cycloaliphatic diisocyanates containing at least 75 mols% of 1-isocyanato-3-isocyanatomethyl-3,5,5-trimethylcyclohexane, if desired mixed with monomeric aliphatic and cycloaliphatic diisocyanates such that this mixture has an NCO content of between 2.0 and 7.0% by weight are reacted with dihydrazide compounds dissolved in 0.5 to 5 times their weight of water, the reaction being carried out in a solvent mixture consisting of a. optionally chlorinated aromatic hydrocarbons and/or aliphatic chlorinated hydrocarbons,
b. aliphatic and/or cycloaliphatic alcohols, and
c. water, the proportion of $a:b$ being between 1:10 and 10:1 and the total water content in the solvent being between 0.5 and 15% by weight.

The invention also relates to the use of such polyurethane urea solutions for the production of lightfast coatings on textiles, leather and synthetic leather substrates.

It was not foreseeable that high molecular weight polyurethanes would be obtainable by the process according to the invention since the aliphatic NCO groups of the prepolymer react relatively slowly with dihydrazides and it was therefore expected that a reaction with water would preferentially take place but above all that a chain breaking reaction with the (cyclo) aliphatic alcohols would take place in the solvent mixture.

It is surprisingly found, however, that the process according to the invention yields stable solutions of very lightfast (i.e. resistant to degradation of the mechanical properties on exposure to light) polyurethanes in solvent mixtures which are very easy to handle. During formation of the coating, the water contained in the solvent mixture causes coagulation of the polymer as the solvent evaporates, with the result that the coatings obtained have an advantageous permeability to water vapor.

The major advantage of the dihydrazides used as chain lengthening agents according to the invention lies in the improved light fastness of the end products. Thus if prepolymers based on 1-isocyanato-3-isocyanatomethyl-3,5,5-trimethylcyclohexane are chain lengthened with the diamines previously used, the resulting polyurethane systems, because they have been synthesized from aliphatic components, while generally remaining colorless nevertheless undergo rapid deterioration in their mechanical properties on exposure to light.

Polyurethane ureas prepared by the process according to the invention (strictly speaking the polymers do not contain urea groups but more complicated structures such as e.g. —NH.CO.NH.NH.CO— but the term "urea" is used here for the sake of brevity) contain as characteristic "hard segments" structures of the following formula —CO.NH—R—NH.CO.NH.NH.CO.X-.R'.X'.CO.NH.NH—CO—NH—R.NH.CO— which result from the reaction of isocyanate prepolymers which carry the following end groups —CO.NH.R—N=C=O with dihydrazides of the formula $H_2N.NH.CO.X.R'.X'.CO.NH.NH_2$ in which at least 75% of the radicals R consist of

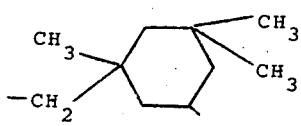

and not more than 25% consist of other aliphatic or cycloaliphatic radicals,

R' is a straight chain or branched alkylene group with 2—10 carbon atoms and

X and X' = —NH— or —O—;

X and X' need not necessarily be the same nor need they necessarily be present.

These so-called hard segments may contain the typical diisocyanate groups more than once. They are generally attached to the so-called soft segments obtained from the higher molecular weight polyhydroxyl compound or to the segments of low molecular weight dialcohols and diisocyanates by way of urethane groups.

The NCO prepolymers used according to the invention are prepared solvent-free or in inert solvents by known methods.

The diisocyanate component used as 1-isocyanate-3-isocyanatomethyl-3,5,5-trimethylcyclohexane, preferably in the form of its natural stereoisomeric mixture. Other aliphatic or cycloaliphatic diisocyanates, for example hexamethylene-1, 6-diisocyanate; 2,2,4-trimethylhexane-1,6-diisocyanate, lysine ester diisocyanates, undecamethylene diisocyanate, cyclohexane-1-4- (or 1,3-) diisocyanate, dicyclohexylmethane-4,4'-diisocyanate, 3,3'-dimethyl-dicyclohexylmethane-4,4'-diisocyanate and others may also be used in amounts of up to about 25 mols percent.

These additional diisocyanates in most cases increase the solubility by copolyurea formation when used in small quantities but if a certain optimum is exceeded, the solubility again decreases because 1-isocyanato-3-isocyanato-methyl-3,5,5-trimethylcyclohexane generally gives rise to more soluble products than the other aliphatic or cycloaliphatic diisocyanates. Suitable mixtures can easily be found for any particular polyurethanes or solvent mixtures by simple tests.

The higher molecular weight polyhydroxyl compounds used in the process according to the invention have molecular weights of between 500 and 5000, preferably 800 to 3000, and melting points below 60°C, preferably below 45°C, and have a substantially linear structure. Mixtures of such compounds may be used if desired.

Suitable polyhydroxyl compounds are in particular those polyesters, polylactones or polycarbonates known in polyurethane chemistry which contain two terminal hydroxyl groups. Particularly to be mentioned as examples are the polylactones of ε-caprolactone, polyesters obtained by the condensation of caprolactone with diols such as hexane-1,6-diol, and polyesters of aliphatic dicarboxylic acids and dialcohols or mixtures of dialcohols such as ethylene glycol, propylene glycol, butane-1,4-diol, 2,2-dimethylpropane-1,3-diol, hexane-1,6-diol or bis-hydroxymethyl-cyclohexane. Polyesters which contain more than 5 carbon atoms in the diol portion improve the resistance of the resulting products to hydrolysis. Polycarbonates or copolycarbonates of hexane-1,6-diol containing some built in adipic acid or adipic acid-bis-hydroxyethylesters are particularly resistant to hydrolysis and are preferred.

Dihydroxypolyethers of the kind known in polyurethane chemistry may also be used but owing to their ether structure they are much more susceptible to oxidation and degradation unless they are suitably stabilized. Ethoxylation or prepoxylation product, for example, of suitable initiator molecules such as water, ethylene glycol or butane-1,4-diol and particularly α,ω-dihydroxy-polytetramethyleneether may be used for the process of the invention.

Prepolymer formation with the diisocyanates may also be carried out in the presence of small quantities (preferably 0.05 to 1.0 mol per kg of elastomer) of low molecular weight diols with a molecular weight of between 62 and 500, particularly those which contain one or more tertiary, aliphatically substituted amino groups, for example butane-1,4-diol, hydroquinone-bis-hydroxyethylether, bis-(β-hydroxyethyl)- methylamine, bis-(β-hydroxypropyl)-tert.-butylamine, etc..

Other examples of higher molecular weight, substantially linear polyhydroxyl compounds and of low molecular weight diols suitable for the process according to the invention may be found in the patent specifications quoted above.

The hydrazide compounds used for the process according to the invention are bifunctional hydrazide, semicarbazide or carbazic ester derivatives which have a saturation concentration of less than 0.5% by weight in the hydrocarbons, alcohols or mixtures used at temperatures of up to about 100°C but which can be completely dissolved in about 0.5 to 5 times (preferably 1 to 2.5 times) the quantity by weight of water (based on the hydrazide compound), if necessary by heating to about 80°C.

It has been found that alcohol soluble hydrazide compounds generally result in such low melting hard segments in the polyurethane ureas that the polymers obtained have melting points of less than 170°C and are therefore unusable for technical purposes.

These polyurethane ureas are also too highly soluble and undergo too much swelling in liquids and are therefore insufficiently resistant to cleaning processes.

On the other hand, hydrazides which are insoluble both in alcohol and in water are also unusable as chain lengthening agents because they cannot be reacted sufficiently rapidly with the NCO prepolymers and consequently instead of a chain lengthening reaction, chain breaking occurs due to the reaction of the NCO groups of the prepolymer with the OH groups of the solvent components.

Among the numerous known hydrazide chain lengthening agents, therefore, the only ones which can suitably be used for preparing the polyurethane urea solutions according to the invention are those which are insoluble in alcohol but soluble in water to a limited extent (0.5 to 5 times the weight of hydrazide compound). Hot water may be used to improve solubility.

It was found that the most suitable hydrazide compounds for the purposes of the invention are straight chain or branched chain aliphatic alkylene dicarboxylic acid hydrazides which contain from 1 to about 10 carbon atoms in the alkylene chain, for example malonic acid dihydrazide, succinic acid dihydrazide, glutaric acid dihydrazide, adipic acid dihydrazide, β-methyl-adipic acid dihydrazide, sebacic acid dihydrazide and hydracrylic acid dihydrazide. Oxalic acid dihydrazide is unsuitable in spite of its solubility in water because it immediately precipitates in the solvent mixture of hydrocarbon and alcohol and cannot be reacted in this form. Although carbohydrazide can be reacted, it forms complexes with heavy metals which discolor badly and severely restrict the possibilities of using such polyurethanes.

Aromatic dihydrazides, for example terephthalic acid dihydrazide, cannot be used because they are usually insufficiently soluble in water.

The following hydrazides, however, are very suitable as chain lengthening agents: Semicarbazide-alkylene hydrazides such as β-semicarbazide-propionic acid hydrazide $H_2N.NH.CO.NH.(CH_2)_2.CO.NH.NH_2$ (see DOS No. 1,770,591); semicarbazide-alkylene carbazic esters such as 3-semicarbazidopropyl-carbazic ester $H_2N.NH.CO.NH.(CH_2)_3.O.CO.NH.NH_2$ and 2-semicarbazido-ethylcarbazic ester (see DOS No. 1,918,504); as well as amino-semicarbazide compounds such as ω-amino-alkyl-semicarbazide carbonates, e.g. β-aminoethyl-semicarbazide carbonate $H_2N.NH.CO.NH.(CH_2)_2.NH_2xCO_2$ (see DOS No. 1,902,931).

Preferred chain lengthening agents according to the invention are adipic acid dihydrazide, glutaric acid dihydrazide, β-semicarbazidopropionic acid hydrazide and semi-carbazidopropylcarbazic ester.

In addition to the hydrazide chain lengthening agents, minor quantities (up to about 20% by weight based on the chain lengthening agents) of other known chain lengthening agents may be used, e.g. aliphatic diamines such as ethylene diamine, bis-(3-aminopropyl)-methylamine, p-xylylenediamine, etc..

Suitable solvents for the substantially linear aliphatic polyurethane ureas of the structures indicated above used in the process according to the invention are in particular mixtures of (optionally chlorinated) aromatic hydrocarbons or chlorinated aliphatic hydrocarbons with secondary and/or tertiary aliphatic and/or cycloaliphatic alcohols. The solids contents of the solutions are between about 5 and 40%. The aromatic solvent components used may be e.g. toluene, xylene, ethylbenzene, mesitylene, chlorotoluenes, chloroxylenes or hydrocarbons of petroleum hydrocarbon or synthetic fractions which contain predominantly aromatic hydrocarbons (for example Solvesso-100 of Essor which has a boiling range of 156°C to 178°C and a flash point of 45°C). The chlorinated aliphatic hydrocarbons used may be trichloroethylene or perchloroethylene. Secondary or tertiary $C_3$ to $C_8$ alcohols such as secondary or tertiary amyl alcohols, diacetone alcohol, tertiary butanol, tertiary amyl alcohol and tertiary octyl alcohol are also suitable alcohols.

Solvents which have particularly good dissolving properties are mixtures of toluene or xylene with isopropanol, isobutanol or tertiay butyl alcohol with a ratio of hydrocarbon to alcohol of 1 : 10 to 10 : 1 preferably 1 : 3 to 3 : 1. The mixtures have better dissolving properties than the individual components alone.

Solvent components which are quite particularly preferred are the tertiary aliphatic alcohols such as tertiary butanol or tertiary amyl alcohol because unwanted reactions of the NCO prepolymers with the OH groups are practically completely absent in these solvents at room temperature. Suitable solvent combinations, are, for example, toluene and/or xylene and/or Solvesso 100 with tertiary butanol and/or tertiary amyl alcohol mixed in proportions of preferably 1 : 3 to 3 : 1.

Primary alcohols are less suitable for the process according to the invention because they undergo relatively rapid reaction with the NCO prepolymers but they may be used if certain precautions are taken (solutions containing isocyanate should not be left to stand for any considerable length of time).

Owing to the use of aqueous solutions of hydrazide compounds, the solvent mixtures used for the process according to the invention contain between about 0.5 and 15% by weight, preferably 1.0 to 10% by weight of water. The quantity of water which can be tolerated depends among other things on the composition of the solvent mixture and the concentration of the solution. The concentration must be kept sufficiently low to prevent phase separation or precipitation.

Before the solutions are applied, e.g. by spraying, application with coating knife or pressing, other solvents may be added as diluents, either to adjust the solutions to the required viscosity or to obtain the required speed of film formation by the addition of high boiling solvents. Examples of additional solvents used as diluents are: Methylene chloride, tetrahydrofuran, dioxane, ethyl acetate, methyl ethyl ketone and amyl acetate; high boiling solvents used may be e.g. ethylene glycol monomethylether acetate and ethylene glycol monoethylether acetate as well as small proportions of dimethylformamide.

The process according to the invention is preferably carried out as described below:

The NCO prepolymer is first prepared from the higher molecular weight dihydroxy compounds and optionally low molecular weight diols by simultaneous or stepwise reaction with an excess of 1-isocyanato-3-isocyanatomethyl-3,5,5-trimethylcyclohexane optionally in admixture with other (cyclo)-aliphatic diisocyanates by a solvent-free reaction or in inert solvents such as chlorobenzene or toluene. The OH/NCO ratio employed is generally 1 : 1.5 to 1 : 5, preferably 1 : 2 to 1 : 3.5, the exact value depending on the molecular weight of the dihydroxy compounds (if the ratio of OH:NCO is less than 1 : 2 then the mixture will still contain free low molecular weight diisocyanate at the end of the reaction. It is found that such mixtures are particularly suitable for the process of the invention). It is preferred to use a ratio such that the NCO content of the NCO prepolymer or prepolymer/diisocyanate mixture (based on solid substance) is between 2.0 and 7.0% of NCO, preferably between 3.0 and 6.0% of NCO.

The aqueous solution of hydrazide compounds is then mixed with the hydrocarbon/alcohol solvent mixture and the solution obtained is then reacted with the mixture obtained from the prepolymer formation to effect chain lengthening. Although the aqueous mixture of hydrocarbon, alcohol and dihydrazide is in most cases not a stable solution (if left to stand, the hydrazide compound would separate by crystallization), the solution stability is sufficient to enable chain lengthening to be carried out in a homogeneous phase after the solution has been mixed with the NCO prepolymer. The solubility of the solution may be increased by heating to about 50–80°C. The process according to the invention may also be carried out by running the aqueous solution of hydrazide chain lengthening agent into a prepared solution of the NCO prepolymer in the hydrocarbon/alcohol mixture; alternatively, the reaction between the components may advantageously be carried out by a continuous process of dosing and mixing. The hydrazide compound progressively disappears from the solution as a result of the NCO/hydrazide reaction and therefore does not precipitate from the increasingly viscous solution even after a long time. The chain lengthening reaction proceeds considerably more slowly than, for example, with aliphatic diamines and can be completed in the course of about 15 to 120 minutes or more, during which time the temperature of the reaction mixture should be raised to about 50–60°C.

The presence of such a large quantity of water would be expected to interfere with the chain lengthening reaction since water is normally also capable of reacting with NCO groups. It was found, however, that in the aqueous solution system used according to the invention, even if left to stand for a considerable time, no viscous elastomer solution is obtained from the NCO prepolymer without the addition of hydrazide chain lengthening agent.

The substantially linear, segmented polyurethane urea elastomers free from end groups which are obtained by the process according to the invention should have viscosities corresponding to an $\eta_i$ value (equal to the natural logarithm of the relative viscosity $\eta_R$) of a 1% solution in hexamethylphosphoramide determined at 25°C of preferably above 0.5 and particularly above 0.70.

The melting points (temperatures at which products become liquid on the Kofler block) of the polymers should be above 170°C.

The polyurethane solutions may be modified in the usual manner by the addition of additives such as stabilizers, age resistors, antihydrolytic agents, UV absorbers, soluble dyes, organic or inorganic dye pigments, fillers, carbon black or white pigments. In addition there may be added other plasticizers or soluble polymers such as nitrocellulose, cellulose esters and ethers and other derivatives as well as soluble polymers or polycondensates, especially ethylene/vinyl acetate copolymers or their saponification products in which preferably 20 to 75% of the vinyl acetate groups have been saponified to hydroxyl groups.

The elastomer end products according to the invention can be worked up from their clear or sightly cloudy solutions without any additives to give rise to transparent films which have advantageous properties and non-sticky surfaces. A suitable choice of the ratio of prepolymer to chain lengthening agent (preferably equivalent or excess quantities of hydrazide; molar ratio 1 : 1.0 to 1 : 1.15) can insure that the polymer which is to be worked up no longer contains any free NCO groups. Moreover, any isocyanate groups still present react with the hydroxyl groups of the solvent. If desired, small quantities of a monoamine may be added to block any remaining NCO groups.

Application of the polyurethane urea solutions to form coatings on substrates or intermediate supports may be carried out by any of the known methods such as casting, application with coating knife, painting, brush application, spraying or pressing. Relatively "soft" polyurethane products CNCO content of the prepolymer used approximately 2.5 to 4.5%, based on the solid substance) may be used for producing textile coatings for example on fleeces or woven or knitted fabrics of any construction and in any state of aftertreatment (for example on napped or pile surfaces). The solutions may also be applied to intermediate supports such as release papers, steel strips or the like, in which case the foils produced may then be transferred by reversal processes.

Products with a "harder" polyurethane adjustment (NCO contents about 4 to 7% in the prepolymer) are preferably used as top coats or finishes for textile coatings or on leather or synthetic leather.

The following Examples serve to explain the process of the invention in more detail. The composition of the mixtures is given in parts by weight unless otherwise indicated.

EXAMPLE 1

900 Parts of a polyester of adipic acid and hexane-1,6-diol (OH number 132.2), 22.1 parts of N-methyl-N,N-bis-($\beta$-hydroxypropyl)-amine, 465.3 parts of 1-isocyanato-3-isocyanatomethyl-3,5,5-trimethylcyclohexane and 348 parts of chlorobenzene are heated at 90° to 99°C for 320 minutes for prepolymer formation until the NCO content is 5.18% (based on the solids content).

47.7 parts of β-semicarbazido-propionic acid hydrazide are dissolved in 141 parts of water and mixed with 720 parts of a toluene/isobutanol solution (mixing ratio 1 : 1) and then with 600 parts of the NCO prepolymer solution described above. A cloudy, low viscosity mixture is obtained the viscosity of which rises to about 250 poises after 30 minutes and reaches its final value of 450 poises (28.5% solids content) on further stirring. When the colorless, slightly cloudy solution is dried on a surface, it gives rise to a transparent foil which melts at about 210°C but starts to undergo noticeable softening at 190°C. The $\eta_i$ value is 0.92.

The foils have a mechanical strength of 600 kg/cm$^2$ and an elongation of 420%. After 24 days in a hydrolysis test at 95% relative humidity at 50°C, these values are reduced to 510 kg/cm$^2$ and 500% elongation.

When exposed to light, the foils remain colorless and are found to have the following properties: 66 hours in Fadeometer 535 kg/m$^2$, 450% elongation 400 hours in Xenotest exposure 550 kg/m$^2$, 420% elongation.

The solution, which is stable and flows smoothly, can be applied to cotton fabrics and then dried at 105°C for 5 minutes. The coatings obtained are clear and have a smooth, non-sticky and non-blocking surface. The resistance to swelling in trichloroethylene and perchloroethylene (75% increase in volume by swelling) are good to satisfactory.

EXAMPLE 2

A napped cotton fabric weighing about 220 to 240 g/m$^2$ is coated with the polyurethane solution of Example 1 by a reversal process on a coating apparatus using doctor rolls. The solution is applied as a top coat to the release paper and in its first passage through the drying channels of the coating apparatus it is dried at temperatures rising from 80°C to 120°C. The amount of coating applied corresponds to about 40 to 50 g/cm$^2$ of solid material. In the second passage through the apparatus, elastomer solution diluted with about 5 to 10% of dimethylformamide or cyclohexanone is applied as bonding layer to the dry top coating, the fabric is backed on to this bonding layer and the web is again dried in the drying channel. After leaving the drying channel, the release paper and backed fabric are rolled up separately. The total amount of polyurethane applied to the fabric is about 60 to 90 g/cm$^2$. The solutions may be colored if desired by incorporating about 10 to 20% of pigments.

EXAMPLE 3

The approximately 28% polyurethane solution from Example 1 is diluted to 20% with a 1 : 1 mixture of ethylene glycol and xylene and then applied by doctor coating in a thickness of 12 μ to a knitted cotton fabric (black) which has been coated with polyurethane by a conventional reversal process. After 2 minutes drying at 120°C, a high gloss finish with a pleasant handle is obtained which can withstand more than 300 abrasions when tested in the VESLIC testing instrument as specified in Schweizer Farbechtheitsprufungsblatt C 4500 and is undamaged after 100,000 flexures in the Flexometer (DIN 53340).

EXAMPLE 4 a. NCO prepolymer formation

1500 Parts of a hexane-1,6-diol polycarbonate (molecular weight 1925), 30.2 parts of N-methyl-bis-(β-hydroxypropyl)-amine, 392.5 parts of 1-isocyanato-3-isocyanatomethyl-3,5,5-trimethyl-cyclohexane and 487 parts of toluene are heated to 90°–98°C for 2 hours until the NCO content is 3.225% (based on the solids content).

b. Chain lengthening with variation of the solvent used 3.95 Parts of ε-semicarbazido-propionic acid hydrazide are dissolved in 10 parts of water, mixed with 189 parts of the given solvent (mixture) and then mixed with 100 parts of the NCO prepolymer solution with stirring.

The results are summarized in Table 1.

EXAMPLE 5

3000 Parts of a hexanediol polycarbonate (molecular weight 1925), 900 parts of isophorone diisocyanate and 980 parts of toluene Table I

| Solvent | | Viscosity/ Poise/20°C | Appearance | Remarks |
|---|---|---|---|---|
| Toluol/Isopropanol | 50:50 | 170 | clear, homogeneous solvent | solvent rigid, melting point of the transparent, flexible foil is 215°C |
| Toluol/Isopropanol | 35:65 | 170 | somewhat cloudy solvent | solvent separates small amounts of opacity |
| Toluol/Isopropanol | 65:35 | 360 | slightly cloudy homogeneous solvent | solvent stable |
| Toluol/Isopropanol | 80:20 | 610 | cloudy, homogeneous solvent | solvent stable |
| Toluol/Isopropanol | 100:0 | — | cloudy paste | — |
| Toluol/Isopropanol | 0:100 | — | elastomer is omitted at production | |
| Toluol/Ethanol | 50:50 | 96 | clear, homogeneous solvent | |
| Xylol/Isopropanol | 50:50 | 150 | clear, homogeneous solvent | |
| Toluol/Ethyleneglycolmonomethylether | 50:50 | 250 | clear, homogeneous solvent | |
| Toluol/2-Methylpentanol | 50:50 | 610 | cloudy solvent | solvent not quite firm, turns rigid when adding DMF |
| 3-Chlortoluol/Isopropanol | 50:50 | 240 | slightly cloudy, homogeneous solvent | |

Table I -Continued

| Solvent | Viscosity/Poise/20°C | | Appearance | Remarks |
|---|---|---|---|---|
| Toluol/Isoamylalcohol | 50:50 | 150 | clear homogeneous solvent | slight water separation (when adding Dioxan, it becomes homogeneous again) |
| Trichloroethylene/Isopropanol | 50:50 | 170 | clear homogeneous solvent | |
| Perchloroethylene/Isopropanol | 50:50 | 270 | clear homogeneous solvent | viscosity increases with longer storage |
| Toluol/Tetrahydrofuran | 50:50 | — | pasty | comparative test |
| Toluol/Dioxan | 50:50 | — | pasty | comparative test | are reacted together for 7 hours at 90° to 98°C to produce a prepolymer with an NCO content of 5.25% (based on solid substance).

a. Chain lengthening with β-semicarbazido-propionic acid hydrazide 56.3 Parts of β-semicarbazido-propionic acid hydrazide are dissolved in 113 parts of water and then added to a mixture of 700 parts of the above NCO prepolymer solution with 1330 parts of isopropanol/toluene (1:1) and heated to 50°C for 2 hours. The viscosity slowly rises and a slightly cloudy solution with a viscosity of 470 poises is obtained. The $\eta_i$ value of the substance is 0.828; after 4 hours heating to 80°C it is 0.797 (degradation only 3.6%). A transparent foil cast from the solution is exposed to light in the Fadeometer and by the Xenotest and is found to have substantially improved resistance to mechanical degradation when compared with a similar foil which has been chain lengthened with ethylene diamine (see comparison sample 5 b) Table 2.

b. Comparison sample: Chain lengthening with ethylene diamine 60.0 Parts of ethylene diamine are added dropwise to a solution to 2000 parts of NCO prepolymer (see above) in 3.880 parts of toluene/isopropanol with vigorous stirring. A viscous elastomer solution (180 poises) is obtained. The $\eta_i$ value is 0.88.

The melting points of foils obtained from this elastomer solution are only about 180°C. Exposure in the Fadeometer and by the Xenotest clearly shows a more severe degradation of mechanical strength (while the appearance remains colorless) than in the case of elastomers which have been chain lengthened with hydrazide compounds. In addition, the substance which has been chain lengthened with diamine undergoes a higher degree of swelling in cleaning solvents (trichloroethylene) than the elastomer coating chain lengthened with hydrazide. The resistance to abrasion is also lower than in 5a).

EXAMPLE 6

The polyurethane solution from Example 5a is applied undiluted to a synthetic leather in a thickness of 12 μ by the process described in Example 3 using a doctor coater and dried. The finish obtained is glossy, abrasion resistant (more than 300 abrasions) and resistant to folding (over 100,000 flexures). The lightfastness of the colorless film (poured on glass, stripped after drying) is very high (abobe scale 7 of the International ISO-Blue type scale). The resistance to hydrolysis of the film (70°C, 95% relative humidity) is good. After four weeks, the tensile strength was found to be still 80% of the original value.

EXAMPLE 7

600 Parts of a hexanediol polycarbonate (molecular weight 1925), 12.05 parts of N-methyl-bis(β-hydroxypropyl)-amine, 157.2 parts of 1-isocyanato-3-isocyanatomethyl-3,5,5-trimethyl-cyclohexane and 133 parts of toluene were heated to 105°–116°C for 150 minutes until the NCO content of the prepolymer was 3.46% (based on solid substance).

5.3 Parts of β-semicarbazido-propionic acid hydrazide are dissolved in 10.6 parts of water and mixed with 187 parts of toluene/isopropanol (1 : 1) at 50°C, and introduced with stirring into 100 parts of the above prepolymer solution, the viscosity of the solution then slowly increasing to about 130 poises/28% solids concentration. A transparent foil produced from this substance starts to soften at 175°C, becomes very soft at 200°C and melts at 215°C. $\eta_i$ : 0.65. The solution can be used for producing a textile coating as described in Example 2. The coating obtained is non-sticky, very resistant to hydrolysis and stable to light.

Table II

Comparison of Light Stabilities

| Example No. | Chain Elongation | Light Exposure (hrs) | Fadeometer- ultimate tensile strength g/dtex | Exposure Elongation % |
|---|---|---|---|---|
| 5a | Semicarbazidepropionic- acidhydrazide | Original | 0.87 | 448 |
| | | 66 | 0.78 | 431 |
| | | 110 | 0.77 | 419 |
| | | 154 | 0.77 | 443 |
| 5b | Comparison Test Ethylenediamine- elongation | Orginal | 0.86 | 431 |
| | | 66 | 0.60 | 473 |
| | | 110 | 0.48 | 467 |
| | | 154 | 0.17 | 429 |

The measurements were made on cut strands (from foils) with a strand thickness of approximately 400 dtex.

EXAMPLE 8

2.86 Parts of adipic acid dihydrazide are dissolved in 5 parts of warer and mixed with 88 parts of toluene/isopropanol (1 : 1). 50 Parts of the prepolymer solution of Example 7 are then stirred into the mixture, a homogenous, viscous elastomer solution (330 poises) being obtained after heating to 50°C for one hour and then leaving to stand overnight at 20°C. The foils produced from this product have a melting point of 215°C (presoftening at 180°–190°C) and an $\eta_i$ value of 0.67. When coated on cotton fabrics, very lightfast coatings with high resistance to hyhdrolysis and a high folding strength are obtained.

EXAMPLE 9

The NCO prepolymer is prepared by heating 1000 parts of hexanediol polycarbonate, 21.3 parts of N-methyl-bis-($\beta$-hydroxy-propyl)amine, 337.8 parts of 1-isocyanato-3-isocyanatomethyl-3,5,5-trimethylcyclohexane and 340 parts of toluene to 97°C for 120 minutes until the NCO content is 5.35% (based on solids content).

a. Chain lengthening with hexamethylene-bis-semicarbazide 18.95 Parts of 1,6-hexamethylene-bis-semicarbazide are dissolved in 38 parts of hot water, mixed with 346 parts of toluene/isopropanol (1 : 1) and immediately stirred up with 161.25 parts of the above NCO prepolymer solution. The solution is then heated at 40°C for 4hours, a slightly cloudy solution with a viscosity of 14 poises being obtained. The melting point of the elastomer foils is 215°C with softening starting at 180°C and becoming pronounced at 200°C. The $\eta_i$ value is 0.54. coatings which are very lightfast and resistant to hydrolysis are obtained.

b. Chain lengthening with α-semicarbazido-acetic acid hydrazide 11.2 Parts of H$_2$N.NH.CO.NH.CH$_2$.CO.NH.NH$_2$(m.p. 138°–140°C) are dissolved in 22 parts of hot water (approximately 70°C) and introduced dropwise in the course of about 12 minutes into a solution heated to 60°C of 161.25 parts of the NCO prepolymer in 317 parts of toluene/isopropanol (1 : 1). After 4 hours at 60°C, the viscosity of the slightly cloudy solution rises to 15 poises. The solution dries to form clear films which have a melting point of 210°C with softening starting at 190°C and becoming pronounced at 200°C.

c. Chain lengthening with γ-semicarbazido-propyl-carbazic ester

5.25 Parts of the carbazic ester semicarbazide are dissolved in 10 parts of water at 45°C and mixed with a solution of 115 parts of toluene/isopropanol (1 : 1) and with 53.75 parts of the above NCO prepolymer solution. The viscosity rises to 22 poises and a homogenous elastomer solution is obtained. Foils obtained from this solution melt at 215°C, start to soften at 180°C and become very soft at 200°C. The $\eta_i$ value is 0.604.

d. Chain lengthening with succinic acid dihydrazide 7.98 Parts of succinic acid dihydrazide are dissolved in 15 parts of water, mixed with 229 parts of toluene/isopropanol (1 : 1), and then mixed with 107.5 parts of the NCO prepolymer at 60°C. After a reaction time of several hours at 60°C, a slightly cloudy solution with a viscosity of 24 poises is obtained. Foils produced from the solution melt at 195°C after severe softening at 180°C. $\eta_i$ value 0.52.

The solutions from Example 9a to 9d have low solution viscosities compared with those of diamine-lengthened solutions which have higher solution viscosities at the same $\eta_i$ values. Hydrazide-elastomer coating solutions can therefore be prepared with higher solids concentrations at the same solution viscosities. Coatings which have excellent lightfastness and resistance to hydrolysis can be prepared from the solutions.

Comparison experiments:

Chain lengthening experiment with terephthalic acid dihydrazide

Terephthalic acid dihydrazide is substantially insoluble in water, toluene and/or propanol. Even when heated to the boiling points of the solvents it is not possible to dissolve sufficient quantities of dihydrazide to carry out a chain lengthening reaction. Terephthalic acid dihydrazide could not be made to undergo reaction even after prolonged heating (80°C) of the prepolymer with the suspended dihydrazide but remained crystalline and the solution remained water thin.

Experiment of chain lengthening with oxalic acid dihydrazide

Oxalic acid dihydrazide dissolves in about 5 to 6 times its quantity of hot water, precipitates very rapidly in a crystalline form when added to toluene-propanol and cannot be reacted with the prepolymer. The chain lengthening agent remains substantially undissolved even after heating.

EXAMPLE 10

1000 Parts of hexanediolpolycarbonate (molecular weight 2150), 19.6 parts of N-methyl-bis-($\beta$-hydroxypropyl) amine, 250.6 parts of 1-isocyanato-3-isocyanatomethyl-3,5,5-trimethylcyclohexane and 318 parts of chlorobenzene are heated at 95°C for prepolymer formation until the NCO content is 3.26% of NCO (based on solid substance).

35 Parts of $\beta$-semicarbazido-propionic acid hydrazide are dissolved in 105 parts of water and mixed with 860 parts of isobutanol/toluene (1 : 1). 700 g of prepolymer are then introduced with vigorous stirring. A cloudy, highly viscous solution is formed which when diluted to 28% has a viscosity of 420 poises. Foils produced from this solution are clear and have a melting point of 210°C. The substance has an $\eta_i$ value of 0.82.

When the solution is worked up into films it has good levelling properties and the films produced are very lightfast and form tack-free, smooth surfaces without blocking and they have a good to satisfactory resistance to tri- and per-swelling (i.e. resistance to dry cleaning in trichloro and perchloroethylene).

The foils do not undergo discoloration even after prolonged exposure to light and show practically no deterioration; their resistance to hydrolysis is alos excellent.

Table 3

|  | Tensile strength (kg/cm²) | Elongation at break (%) |
| --- | --- | --- |
| Original value | 625 | 420 |
| after 66 hours in Fadeometer | 630 | 420 |
| after 400 hours Xenotest exposure | 580 | 440 |
| after 7 days storage at 70°C and 95% relative humidity | 635 | 430 |
| the same, after 14 days | 580 | 480 |

Coating is carried out by the reversal process as described in Example 2 and the products obtained have excellent lightfastness, a pleasant tack-free handle and high bond strength.

Compared with similar coatings produced using ethylene diamine as chain lengthening agent, these coatings have improved stabilities to light and resistances to trichloroethylene.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Stable solutions of polyurethane ureas from prepolymers with terminal isocyanate groups, and dihydrazide compounds in slightly polar, readily volatile solvents prepared by reacting
   a. a prepolymer prepared from
      i. polyhydroxyl compounds with a molecular weight of 500 to 5000 and
      ii. an aliphatic or cycloaliphatic diisocyanate with a proportion of at least 75 mols % of 1-isocyanato-3-isocyanatomethyl-3,5,5-trimethyl-cyclohexane with
   b. an aqueous solution of a dihydrazide compound which has been dissolved in 0.5 to 5 times its weight of water,
   the reaction being carried out in a solvent mixture comprising
      i. aromatic hydrocarbons or aliphatic chlorinated hydrocarbons,
      ii. aliphatic, or cycloaliphatic monohydric alcohols and
      iii. water
   the ratio of i/ii being between 1:10 and 10:1 and the total proportion of water in the solvent being between 0.5 and 15% by weight.

2. The product of claim 1 wherein the polyurethane ureas are prepared from prepolymers with terminal isocyanate groups, low molecular weight diisocyanates and dihydrazide compounds.

3. The product of claim 1 wherein diols with molecular weights between 62 and 500 are used in the preparation of the prepolymer with terminal NCO groups.

4. The product of claim 1 wherein monomeric aliphatic and cycloaliphatic diisocyanates are used in the preparation of the prepolymers with terminal NCO groups and are mixed in so that the NCO content of the mixture, based on isocyanate components, is between 2.0 and 7.0% by weight.

5. The product of claim 1 wherein the solvent mixture includes chlorinated aromatic hydrocarbons.

6. The product according to claim 1 characterized in that the chain lengthening agents used are aliphatic alkylene dicarboxylic acid hydrazides containing 1 to 10 carbon atoms in the alkylene chain, semicarbazide alkylene hydrazides, semi-carbazide alkylene hydrazides, semicarbazide alkylene carbazic esters and aminoalkyl semicarbazides.

7. The product according to claim 1, wherein the solvent components used are aromatic hydrocarbons with a boiling range of up to 178°C or trichloroethylene, perchloroethylene, secondary or tertiary aliphatic alcohols and water, the ratio of hydrocarbons to alcohols being between 3:1 and 1:3 and the water content less than 10% by weight.

8. Stable solutions of polyurethane ureas comprising
   I. between 5 and 40% by weight of a polyurethane urea prepared from
      a. a prepolymer from polyhydroxyl compounds with molecular weight of 500 to 5000 and an aliphatic and/or cycloaliphatic diisocyanate with proportion of at least 75 mols % of 1-isocyanate-3-isocyanatomethyl-3,5,5-trimethyl-cyclohexane and
      b. dihydrazide-compounds
   ii. aromatic hydrocarbons and/or aliphatic chlorinated hydrocarbons,
   iii. aliphatic and/or cycloaliphatic monohydric alcohols and
   IV. water,
   the ratio of (II)/(III) being between 1:10 and 10:1 and the total proportion of water in the solvent being between 0.5 and 15% by weight.

* * * * *